(No Model.)
F. B. RAE.
CONTROLLING SWITCH FOR ELECTRIC RAILWAYS.
No. 446,613. Patented Feb. 17, 1891.
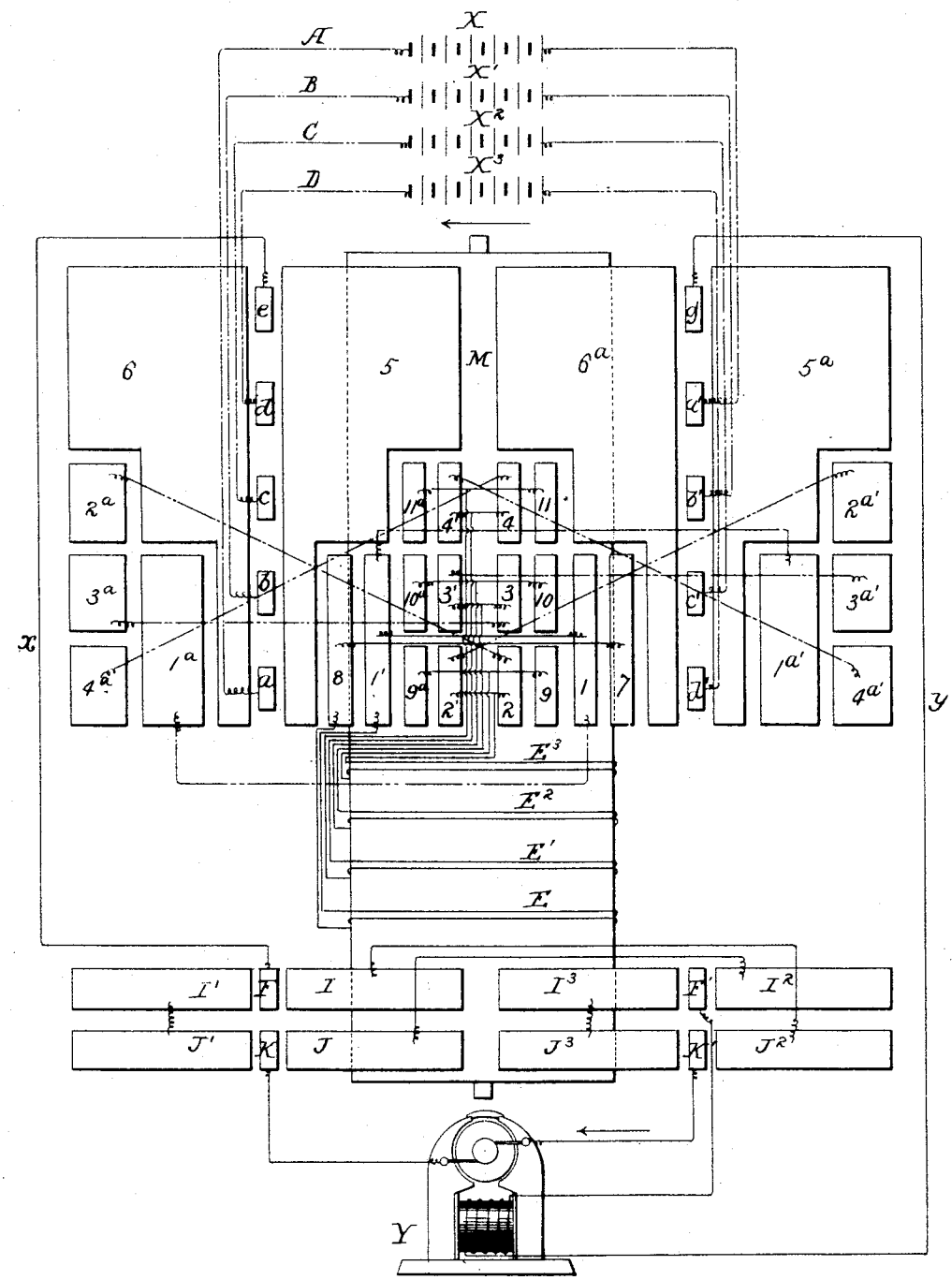
WITNESSES
INVENTOR

United States Patent Office.

FRANK B. RAE, OF DETROIT, MICHIGAN, ASSIGNOR TO THE DETROIT ELECTRICAL WORKS, OF SAME PLACE.

CONTROLLING-SWITCH FOR ELECTRIC RAILWAYS.

SPECIFICATION forming part of Letters Patent No. 446,613, dated February 17, 1891.

Application filed August 22, 1890. Serial No. 362,763. (No model.)

*To all whom it may concern:*

Be it known that I, FRANK B. RAE, a citizen of the United States, residing at Detroit, in the county of Wayne and State of Michigan, have invented certain new and useful Improvements in Controlling-Switches for Electric Railways, of which the following is a specification.

My invention relates to a controlling-switch designed more particularly for use with storage-batteries in connection with motors for driving cars and other processes; and it has for its object to provide means whereby the energy from the batteries can be applied in propelling and regulating the motor according to the character of the work to be done, so that the direction of rotation of the motor and the speed at which it rotates can be regulated and at the same time excessive discharge from the battery-cells prevented in making the various connections.

In carrying out my invention I provide a switch device constructed and arranged substantially as hereinafter more particularly set forth, and connect the same to the battery-cells, which are arranged in groups, and also connect the proper resistance devices in the circuits while making the various connections to prevent the cells discharging, all of which will be more specifically set forth hereinafter.

In the accompanying drawings I have illustrated my invention diagrammatically, the figure showing the switch in the form of a cylinder the plates of which have been straightened out in order to more clearly show the various connections and the circuits, and the connections between the various plates of the switch, the brushes, the battery, and motor are indicated conventionally.

While my invention may be carried out in various mechanical structures and arrangements different from each other, in accordance with the particular kind of work to be done, I have illustrated and will describe the principles of my invention in connection with one arrangement which I have found exceedingly practicable in the operation of cars for electric railways, and it is to be understood that my invention is not limited to the precise form or construction indicated.

I have shown the battery-cells $X\ X'\ X^2\ X^3$ arranged in four groups, each group preferably consisting of one-quarter of the total number of cells necessary to operate the car. The motor Y is in a circuit from these cells, and interposed between the cells and the motor is the controlling switch device and connections.

The groups of cells are so arranged that upon the first movement of the switch from the neutral position the four groups will be arranged in multiple-arc circuit with the motor, and the current will be directed through the motor to propel it in the proper direction.

If we take one hundred as an illustration of the total number of cells and assume that each cell has an electro-motive force of two volts, then when connected up, as before described, each group of cells will contain twenty-five cells and have an electro-motive force of fifty volts. Consequently when the groups are arranged in multiple arc the total electro-motive force exerted upon the motor will be fifty volts, and the current necessary to start the motor from a position of rest will be drawn equally from the four groups. Supposing now, as I find in practice, that this starting-current with the particular motor employed is to be one hundred and sixty ampères, then each group of cells will discharge forty ampères with an electro-motive force of fifty volts, and with this discharge I find there is no danger of burning or otherwise destroying the motor or circuits. When the motor-armature has reached the greatest speed it will attain with its load under a pressure of fifty volts, the switch is arranged so that on its next movement the cells will be connected into two groups, each group being a multiple arc and each group furnishing an electro-motive force of fifty volts, so that the total electro-motive force furnished under this arrangement will be one hundred volts. This difference of potential accelerates the armature speed of the motor, and I find under the arrangement described that the initial current necessary to produce this acceleration is about eighty ampères, and therefore the output from each group of cells remains about forty ampères, as under the first condition. To further increase the speed of the motor in this arrangement the third movement of the switch places all the cells in series, making a difference of potential or the electro-motive force of the battery two hundred volts, and I have found that the initial current upon the movement of the switch from one position to the other in this instance is about forty ampères, as before; but the revolution of the armature reduces this current more or less, depending upon the condition of the track and the load on the motor. It will thus be seen that in the present arrangement under all conditions the current from any group of cells need not exceed forty ampères, while the electro-motive force of the current can be varied to suit the work to be done. Of course it will be seen that by arranging these cells in a different number of groups and a different number of cells in each group, and carrying out the same principles of connection in the switch, more or less cells may be used in accordance with my invention.

In making successive combinations with the groups of battery-cells it is necessary that the circuit shall not be broken, as this results in the formation of an arc across the contacts, which would be disastrous to the switch. It is at the same time necessary that the battery, or the groups of the cells of the battery, shall not be short-circuited while the switch is being moved from one combination to another. I accomplish these results by providing suitable resistance-coils arranged for the various potentials that exist under varied conditions and connect them with the plates of the switch and the brushes, so that the current flowing through the switch at any change from one condition to another shall not exceed forty ampères in the present arrangement at any time, and this resistance is automatically interposed during the movement of the switch from one point to another, as when the brushes pass from one set of contacts to the next, and in the present instance I have shown the plates of the switch so arranged that the brushes shall bridge the space between the two sets of contacts; or, in other words, the brushes rest upon both contacts at the same time, so that in the first half of the movement the brush reaches a contact to which is attached one side of the resistance through which the current must pass to reach the opposite contact, while the next half of the movement cuts this resistance out, so that the change is effected without breaking the circuit and without short-circuiting the batteries, and the current is kept practically constant at any position of the switch, except so far as it is influenced by the counter electro-motive force of the motor-armature. While these resistance-coils may be variously arranged to produce the desired result, I have shown them mounted upon the cylinder of the switch, and in the present instance they are mounted between the current-reversing plates and the current-connecting plates.

In the drawing, M represents a cylinder covered or consisting of some insulating material, upon which are mounted the various plates of conducting material which are shown displayed. The plates are arranged in duplicate or complementary parts on each semi-circumference of the switch, and the switch is adapted to be rotated in one direction or the other to propel the motor forward or backward, and upon the lower extremity of the switch I have shown the current-reversers consisting of the plates I I' I$^2$ I$^3$ J J' J$^2$ J$^3$, and the brushes F F' and K K' are arranged between these plates and connected to the line in a manner to send the current through the armature of the motor in one direction or the other, according to which way the switch is turned. These plates are connected up, as indicated in the drawings. The plates I' and J' being connected together, the plates I$^3$ and J$^3$ are also connected together, while the plates I and J$^2$ are connected and the plates J and I$^2$ are connected. The brush F is connected by the conductor $x$ with the brush $e$ on the switch. The brush K is connected with one of the brushes of the armature and the brush K' with the other brush of the armature, while the brush F' is connected with the field-magnet coil and through the conductor $y$ with the brush $g$ on the opposite side of the switch to the brush $e$.

The several groups of batteries A B C D are respectively connected with the brushes $a\ a'$, $b\ b'$, $c\ c'$, and $d\ d'$, which are arranged on opposites sides of the switch in reverse order from the end, as shown.

The metal plates 5 5$^a$ and 6 6$^a$ are the complements of each other, and are arranged with straight sides adjacent to the brushes at their neutral positions, while the other sides are stepped or cut away to receive the other contact-plates.

The plates 1 1$^a$, 2 2$^a$, 3 3$^a$, and 4 4$^a$ are connected together on the switch, as indicated by the dotted lines, and the plates 1' 1$^{a'}$, 2' 2$^{a'}$, 3' 3$^{a'}$, and 4' 4$^{a'}$ are similarly connected, as indicated.

The resistance-coil E has its terminals connected to the plates 1' and 8, which plates are in turn connected to the plates 1 and 7. The resistance-coil E' has one terminal connected to the plates 4 4' and the other terminal to the plates 11 11$^a$. The resistance-coil E$^2$ has one terminal connected to the plates 3 3' and the other terminal to the plates 10 10$^a$, while the resistance-coil E$^3$ has its terminals connected respectively to the plates 2 2' and 9 9$^a$.

In the position illustrated in the drawings the brushes are assumed to rest upon the insulated cylinder of the switch, and of course no current is passing, and we will assume that the cylinder is turned in the direction of the arrow to a position where the brushes connected with the batteries and the line $x\ y$ would rest upon the plates 5 5$^a$. Then it will be seen that all these brushes are electrically connected together through the plates 5 5$^a$ and the groups of cells are connected in multiple arc, and the circuit may be traced from the brushes $a\,b\,c\,d$ through the plate 5 to the brush $e$, through the conductor $x$, brush F, plate I to plate $J^2$, brush K′, through the armature in the direction of the arrow to brush K, plate J, through the connecting-wire to plate $I^2$, thence by brush F′ through the field-magnet coils of the motor, and by conductor $y$ to the brush $g$ and plate $5^a$, through the brushes $a'\,b'\,c'\,d'$ to the groups of batteries. In this condition, under the example assumed, there is an electro-motive force of fifty volts and a current of one hundred and sixty ampères, or forty ampères from each group of cells flowing through the motor, and the batteries are thus connected in the most economical manner to start the motor or overcome the inertia of the car or load by the use of a current of large quantity and relatively small electro-motive force. A continued movement of the switch-roller in the direction of the arrow will not alter the connection or the direction of the current through the motor, as the plates upon the reversing part of the switch embrace sufficient of the circumference of the switch-roller to maintain contact through the entire movement of the switch in this direction. The next movement of the switch in the direction of the arrow will first cause the brushes $a\,b$ to bear on contact-plate 8, while the brushes $c'\,d'$ will bear upon the larger plate $1^{a\prime}$. In this position the circuit may be traced through the battery and switch device, leaving out the motor, which will be the same as before, commencing at the brush $g$, passing through the plate $5^a$, the brushes $a'\,b'$ to the group of cells A B in multiple to the brushes $a\,b$, through the contact-plate 8 to the resistance-coil E, thence to contact-plate 1′, and thence by the connection indicated in dotted lines to the larger plate $1^{a\prime}$ to the brushes $c'\,b'$, to the groups of batteries C D, thence to the brushes $c\,d$, plate 5, and brush $e$. In this condition the battery-cells are connected in two groups in multiple arc and the resistance-coil E is interposed between the groups A B and C D and prevent short-circuiting or discharge thereof, while the further movement of the switch carries the brushes $a\,b$ onto the plate 1′, while the opposite brushes $c'\,d'$ will remain on the larger plate $1^{a\prime}$, thus short-circuiting the resistance-coil and finally cutting it out, leaving the groups of cells in multiples of two without the interposed resistance. Under these conditions of the switch the electro-motive force of the current flowing through the motor will be one hundred volts, while the ampères from each group of cells remain practically the same as in the first condition. The next movement in the cylinder will cause the brushes $a\,b\,c$ to contact with the plates $9^a$ $10^a$ $11^a$, and the brushes $b'\,c'\,d'$ to contact with the larger plates $2^{a\prime}$ $3^{a\prime}$ $4^{a\prime}$ and this will connect the groups of battery-cells in series, and between each two succeeding groups will be interposed one of the resistance-coils E′ $E^2$ $E^3$, and upon the further rotation of the switch the brushes $a\,b\,c$ will contact with the plates 2′ 3′ 4′, respectively, the brushes $b'\,c'\,d'$ remaining on their larger contact-plates, and the resistance-coils E′ $E^2$ $E^3$ will be first short-circuited and then cut out in a manner before described, leaving the groups of battery-cells connected in series through the motor, and under these conditions the full power of the batteries will be exerted, if necessary, to propel the car.

It will be understood that in turning off the current the same steps will be gone through, except in the reverse order—in other words, as soon as the switch is moved the resistance-coils will first be interposed between the groups of cells and then the cells will be connected up in multiples of two's, then again the resistance-coil will be interposed between these groups and the groups of cells will be connected up in multiple arc, and then when the switch reaches the normal position indicated in the drawings all the cells will be cut out of circuit. If the motor is to be propelled in an opposite direction, the same steps are gone through, and it is only necessary to turn the cylinder in a direction opposite to the arrow, when the current through the motor-armature will pass in the opposite direction under the varied conditions.

Having thus described the principles of my invention and explained the preferred means of carrying them out, what I claim is—

1. The combination, with the battery-cells arranged in groups and the motor connected with those cells, of an interposed controlling-switch provided with contacts and brushes, substantially as described, and resistance-coils connected with the contacts, whereby the groups of battery-cells may be arranged in various relations, and the resistance device interposed between the groups to prevent short-circuiting, substantially in the manner hereinbefore set forth.

2. The combination, with the battery-cells arranged in groups and the motor connected to the cells, of an interposed controlling-switch having contact-plates and brushes arranged substantially as described, and resistance-coils also arranged on the switch and connected with the contact-plates, whereby the groups of cells may be variously connected without danger of short-circuiting, substantially in the manner described.

3. The combination, with the battery-cells arranged in groups and the motor connected to the cells, of an interposed controlling-switch having contact-plates and brushes arranged substantially as described, resistance devices also mounted on said switch and connected to the plates, and a current-reversing device also mounted on the switch, whereby the groups of cells may be connected up in various relations and directed through the motor in the desired direction and short-circuiting prevented, substantially in the manner described.

4. The combination, with the battery-cells arranged in groups and the motor connected to the cells, of an interposed controlling-switch consisting of a cylinder of insulated material, brushes arranged on opposite sides of the cylinder, complementary plates of conducting material mounted on the cylinder, and resistance-coils also mounted on the switch and connected to conducting-plates, substantially as described.

5. The combination, with the battery-cells arranged in groups and the motor connected therewith, of an interposed controlling-switch consisting of a cylinder covered with insulating material, complementary contact-plates mounted thereon, brushes connected with the terminals of the circuits, arranged on opposite sides of the switch, resistance-coils mounted on the cylinder connected to contact-plates, and circuit-reversing plates also mounted on the cylinder, substantially as described.

6. The combination, with the battery-cells arranged in groups and the motor connected therewith, of an interposed controlling-switch consisting of a cylinder having mounted thereon complementary contact-plates, the said plates consisting, essentially, of four large plates having one straight side and the other side stepped, the large contact-plates arranged adjacent to said steps and connected to the small complementary plates similarly arranged, resistance-coils connected to the small plates, and brushes connected to the terminals of the circuits as arranged on opposite sides of the switch, substantially as described.

In testimony whereof I have signed my name to this specification in the presence of two subscribing witnesses.

FRANK B. RAE.

Witnesses:
JAMES WHITTEMORE,
M. B. O'DOGHERTY.